July 7, 1936.　　　H. A. KOLTERMAN　　　2,046,466
TRACTOR IMPLEMENT
Filed Sept. 5, 1935　　　6 Sheets-Sheet 1

Inventor
Hugo Albert Kolterman
By Clarence A. O'Brien
Attorney

July 7, 1936.  H. A. KOLTERMAN  2,046,466
TRACTOR IMPLEMENT
Filed Sept. 5, 1935   6 Sheets-Sheet 4

Inventor
Hugo Albert Kolterman

By Clarence A. O'Brien
Attorney

July 7, 1936.  H. A. KOLTERMAN  2,046,466
TRACTOR IMPLEMENT
Filed Sept. 5, 1935  6 Sheets-Sheet 5
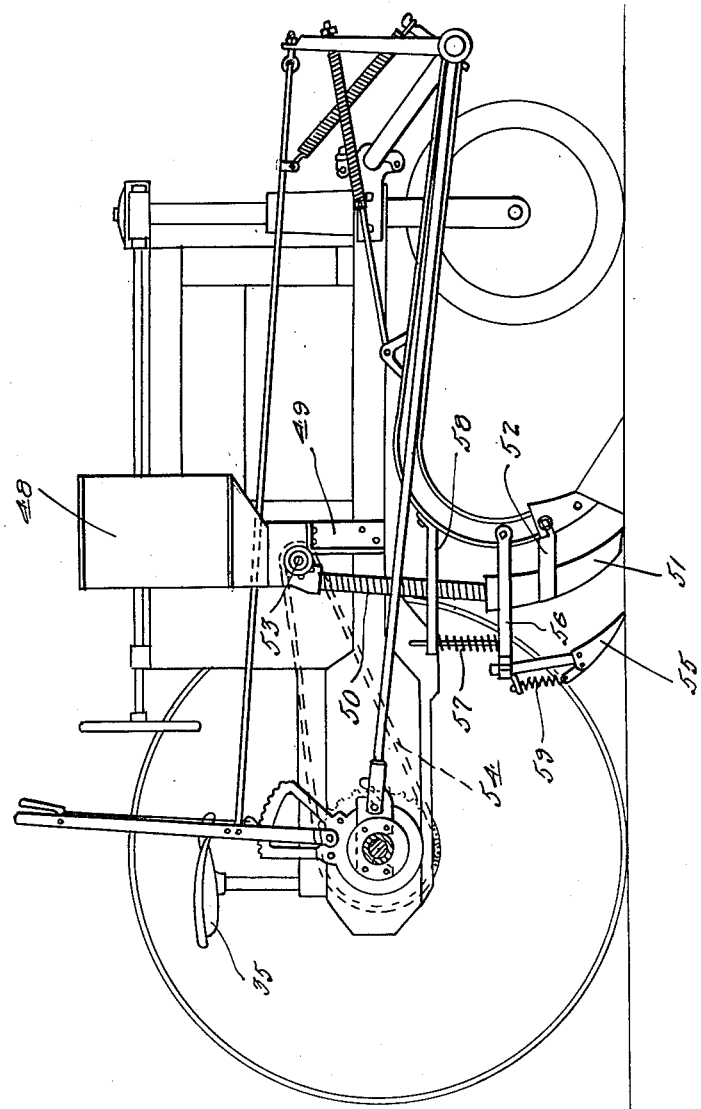
Inventor
Hugo Albert Kolterman
By Clarence A. O'Brien
Attorney July 7, 1936. H. A. KOLTERMAN 2,046,466
TRACTOR IMPLEMENT
Filed Sept. 5, 1935 6 Sheets-Sheet 6
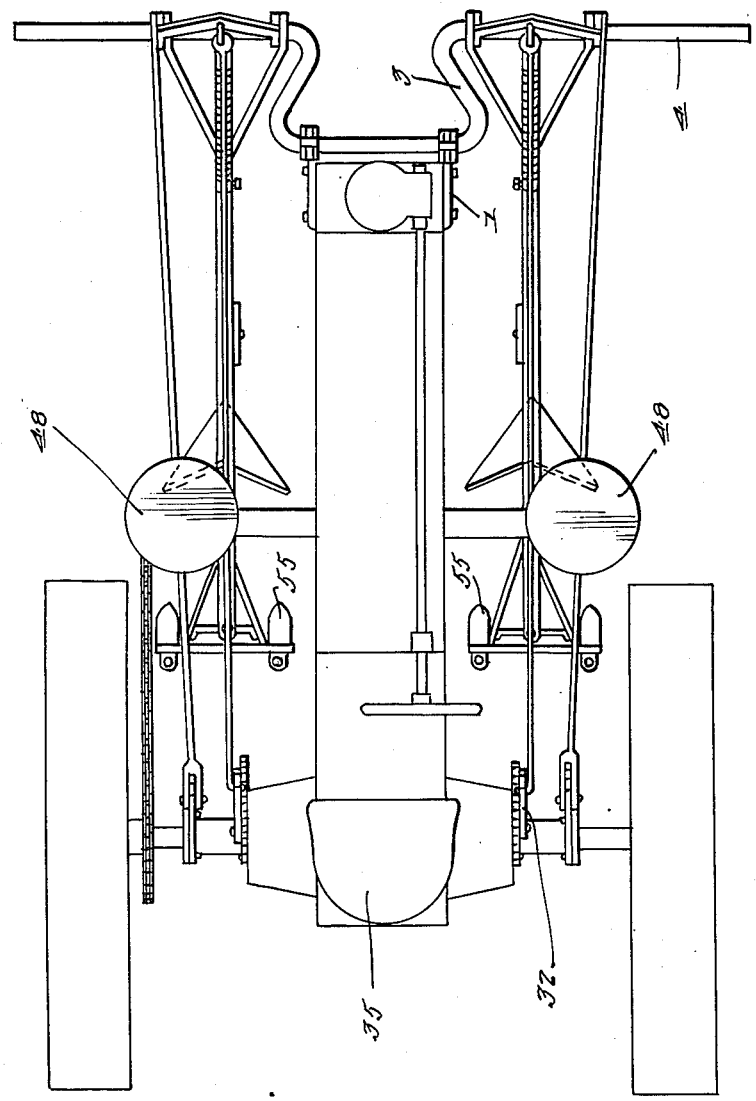
Inventor
Hugo Albert Kolterman
By Clarence A. O'Brien
Attorney Patented July 7, 1936

2,046,466

UNITED STATES PATENT OFFICE 2,046,466

TRACTOR IMPLEMENT

Hugo Albert Kolterman, San Marcos, Tex.

Application September 5, 1935, Serial No. 39,340

5 Claims. (Cl. 97—47)

This invention relates to means whereby various kinds of agricultural implements can be easily and quickly attached to a tractor, the general object of the invention being to provide means whereby the various implements can be easily and quickly attached to a tractor and interchanged, with means also attached to the tractor for controlling the operation of the implements.

Another object of the invention is to so construct and arrange the parts so that they can be controlled and operated from the driver's seat by means of two levers which act to raise and lower the beams, plows and planting and covering devices while the tractor is in motion.

Another object of the invention is to make the devices of two parts so that they can be operated by a small tractor and to so construct and arrange the parts that convenient access is had in making changes and adjusting the various parts.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 6 is a view of the eye carrying bar forming a part of the controlled means for a rear beam.

Figure 7 is a side view with parts broken away showing a planter arrangement attached to the tractor.

Figure 8 is a top plan view of Figure 7.

Figure 1:
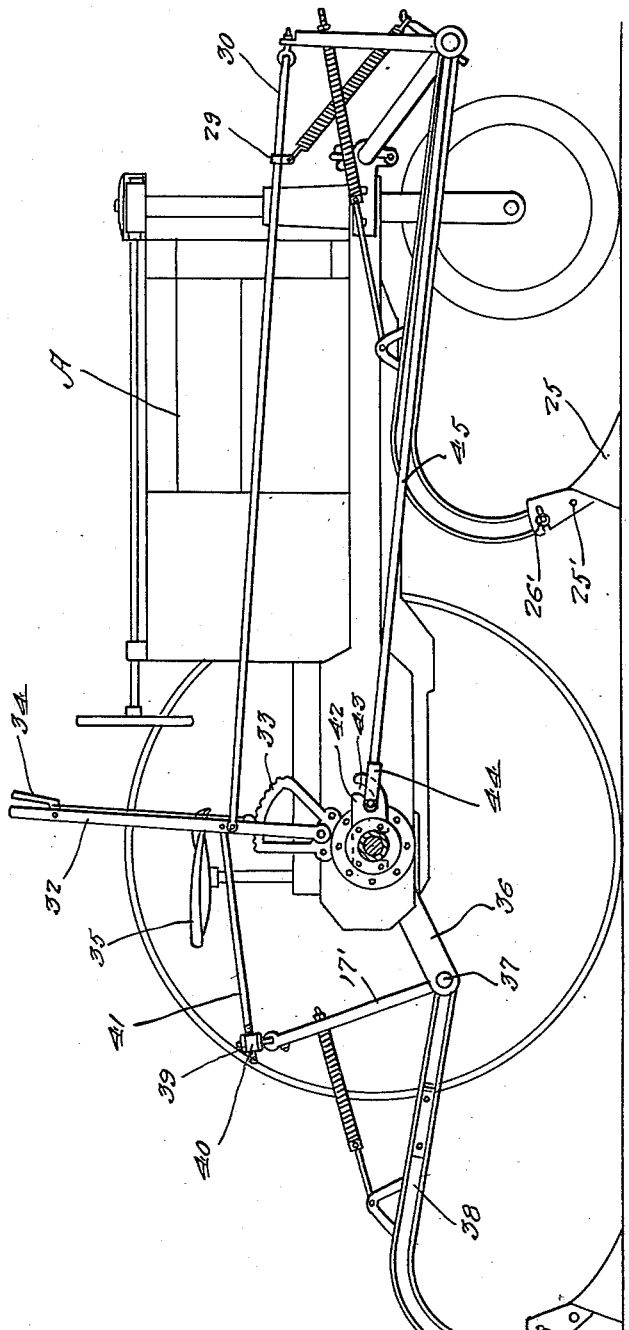
Figure 1 is an elevation with parts broken away showing the plow attachment connected with the front and rear of a tractor.

In these drawings the letter A designates the tractor of any suitable type and in carrying out my invention I provide a pair of T-shaped bars 1 one of which is bolted or otherwise fastened to each side of the tractor at the front thereof with its head projecting beyond the front and said head has a semi-circular recess 2 in its front end for receiving the straight bight part of the central crank 3 of a supporting bar 4. A hinge cap member 5 formed with a semi-circular recess 6 is hinged at its lower edge to the lower end of the head of each bar 1 as shown at 7 with its upper end slotted as shown at 8 to receive the swivelled screw 9 which is swivelled to the upper end of each head as shown at 10. Thus by swinging the member 5 upwardly and placing the bolt or screw 9 in the slot and then applying a winged nut 11 to the bolt the two members will firmly hold the bight of the crank of the bar 4 extending across the front of the tractor with its end portions extending well in advance of the tractor so as to not interfere with the steering movement of the same.

Figure 5:
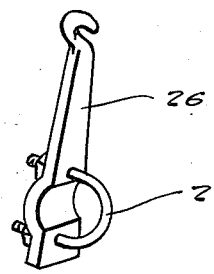
Figure 5 is a view of the spring supporting hook which is to be connected to said front rod.

The plow beams 12 have eyes 13 at the front ends for receiving the extended end portions of the bar 4 and a pair of forwardly diverging brace bars 14 is bolted to each beam as at 15 and said bars 14 have eyes 16 at their front ends for receiving the extended portion of the bar. An inverted V-shaped member 17 has eyes 18 at its ends for receiving each end portion of the bar. A loop member 19 is fastened to the intermediate part of each beam 12 and has a rod 20 pivoted thereto, the rod passing through an eye 21 formed on the upper part of the member 17, as shown in detail in Figure 9 and a collar 22 is adjustably connected to the front end of the rod. A second collar 23 is adjustably connected to the rod 20 and a spring 24 encircles the rod between the eye 21 and the collar 23. This rod 20 connects the beam with the member 17 so that when the member 17 is swung forwardly the plow 25 carried by the beam will be lifted and the spring 24 will tend to press the plow into the ground when the member 17 is swung rearwardly. A hook member 26 shown in Figure 5 is fastened to each end portion of the draw bar 4 by a U-bolt 27 and a spring 28 has one end engaging the hook and its other engaging a clamp 29 on a link 30 which is connected with the upper end of each member 17 as shown at 31. The link extends rearwardly and is connected to a lever 32 pivoted to a sector 33 connected with the rear part of the tractor, it being understood that one of these levers and a sector 33 are arranged at each side of the rear part of the tractor, the usual locking means 34 being provided for each lever and engages the sector 33. Thus it will be seen that an operator sitting in the seat 35 of the tractor can readily operate either or both levers to raise and lower the plows.

Figure 2:
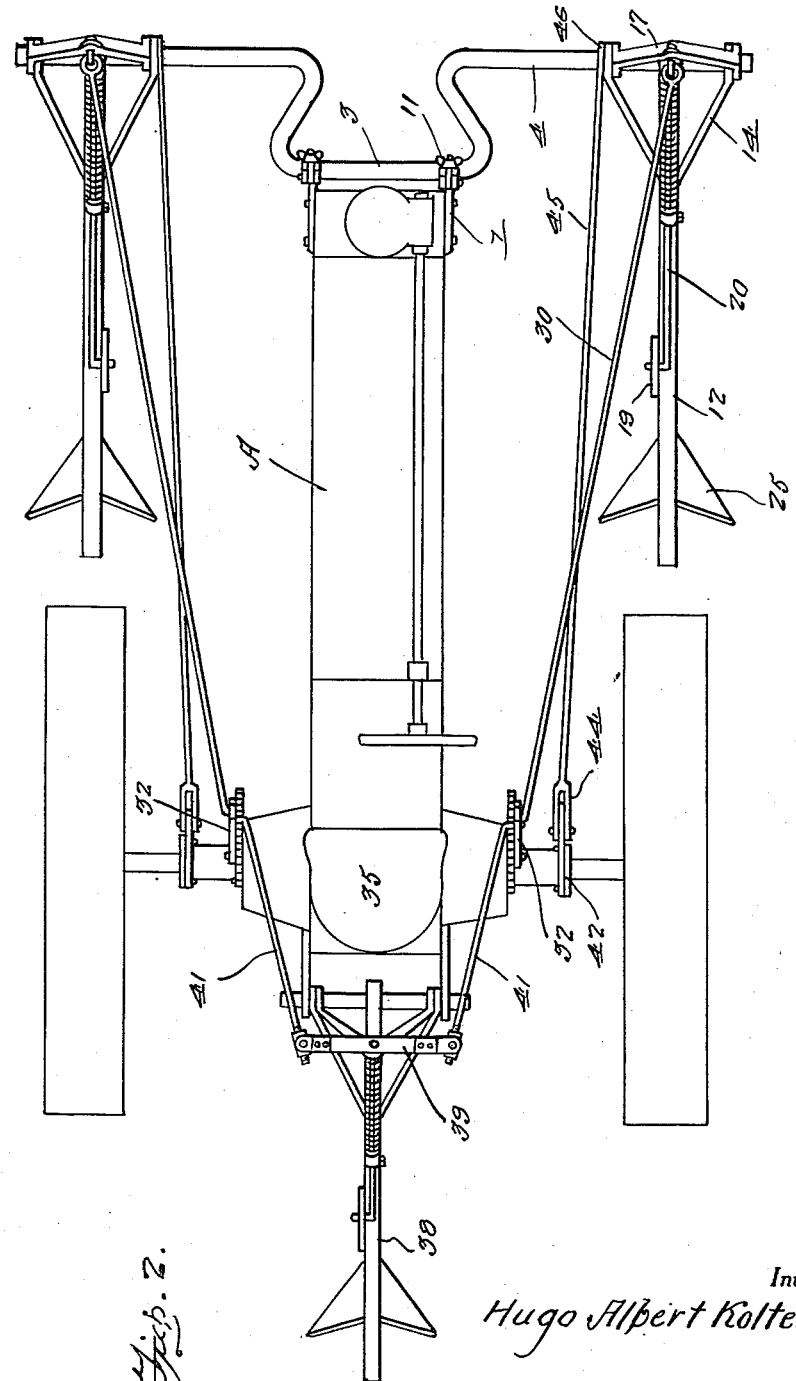
Figure 2 is a top plan view of Figure 1.
Figure 3:
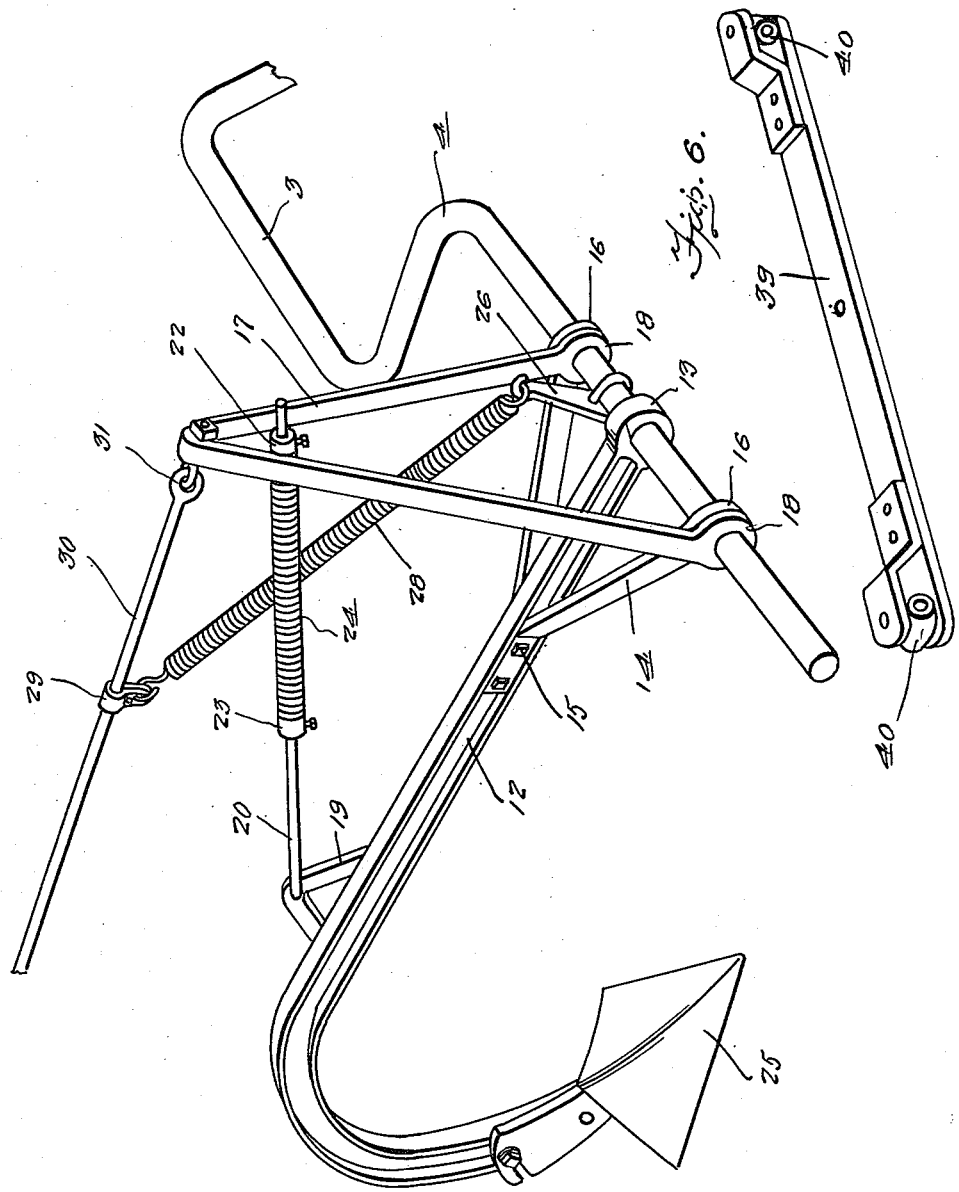
Figure 3 is a perspective view of a plow assembly connected to one end of the front supporting rod.
Figure 4:
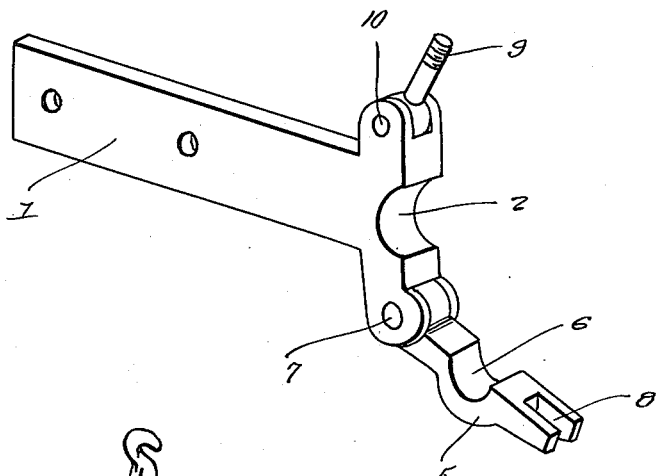
Figure 4 is a view of one of the brackets connecting the front rod to a front part of the tractor.

A pair of downwardly and rearwardly extending arms 36 are connected with the rear part of the tractor and support a shaft 37 to which a plow beam 38 is connected in substantially the same manner as a beam 12 is connected to an end portion of the bar 4 with the plow directly in line with the body of the tractor. Thus the three plows will be arranged as shown in Figure 2. With this rear plow a cross bar 39 (see Figure 6) is pivoted at its center to the top of the V-shaped member 17' and has swivelled eyes 40 at its ends which receive the links 41, the front end of each link being connected with each lever 32 so that by manipulating a lever a front plow and the rear plow will be raised and lowered simultaneously.

A plate 42 is connected to each end of the axle housing at the rear of the tractor and each plate has a notch 43 therein for receiving the clevis 44 on a link 45 which has an eye 46 at its front end for receiving the extended part of the bar 4, these parts forming a brace means for the draw bar 4.

I prefer to make the plow 25 adjustable on its beam through means of the pivot 25' and the bolt and slot connection 26.

Figures 7 and 8 show planter means associated with the front plows and said means include the seed boxes 48, one at each side of the tractor and supported therefrom by the brackets 49 with a flexible conduit 50 extending from each box to the spout 51 which is connected by a brace 52 to the rear portion of the lower part of each beam. The feeding controlling means shown generally at 53 are driven from chain and sprocket means 54, from a rotating part of the tractor. The coverer 55 is provided for each seeder and is connected by a link 56 to the plow beam and a spring carrying rod 57 tends to press the coverer downwardly, the rod being carried by a bracket 58 extending rearwardly from each beam. A spring 59 connects a part of the coverer with a part of the shank thereof and tends to yieldingly hold the same in covered position.

Figure 9:
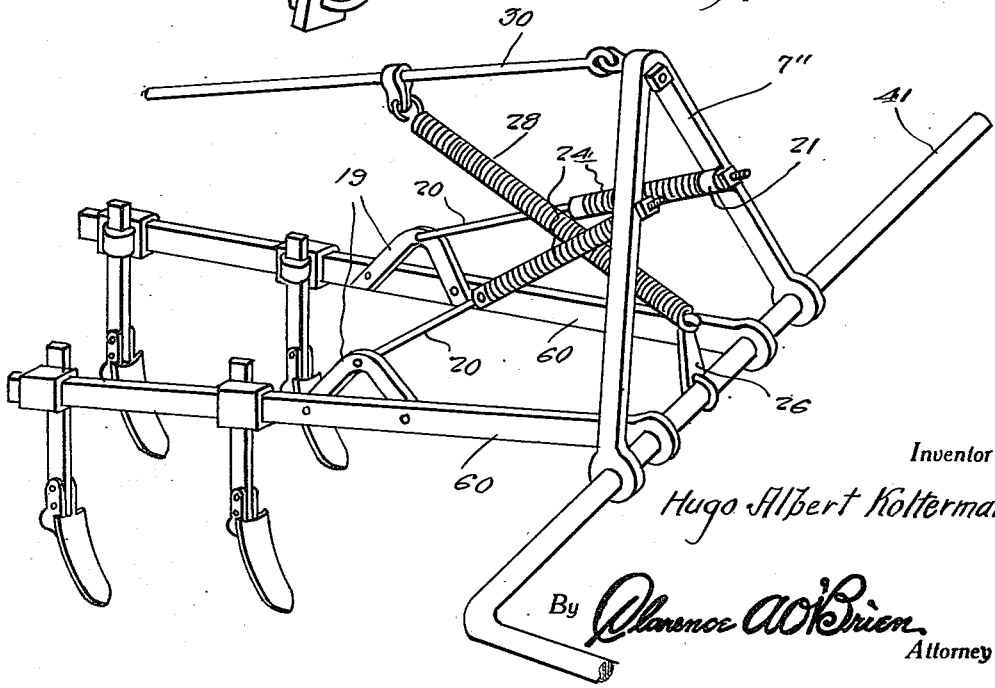
Figure 9 is a view of a cultivator arrangement connected with the front supporting rod.

Figure 9 shows a gang cultivator attached to each side of the draw bar 4', each set of cultivator teeth being carried by a bar 60 having an eye at its front end for receiving a portion of the draw bar and these bars 60 are connected to the V-shaped member 7'' in the same manner as are the plow beams and are operated in the same manner so it is not thought necessary to describe this arrangement in detail.

As it will be seen the parts are readily accessible and can be readily interchanged and removed when necessary and the invention permits the use of plows, cultivators, middle busters, listers and planters with the tractor, the parts being controlled by two levers operated from the driver's seat while the tractor is in motion.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination with a tractor, a draw bar having a rearwardly extending crank part, means for detachably connecting the bight of said crank part with the center of the tractor with the end portions of the bar extending forwardly of the tractor and to opposite sides thereof, implement beams having eyes at their front ends receiving said end portions, upright members having eyes at their lower ends receiving said end portions, a pair of levers at the rear of the tractor, links connecting the same with the upper ends of the upright members, a hook connected with each end portion of the draw bar, a spring having one end connected with the hook and the other to a link and yieldable means for connecting the beams to the upright members whereby the beams will be swung upwardly when the upright members are swung forwardly and the beams will be lowered when the upright members are moved rearwardly, the yielding means also tending to apply pressure to the beams.

2. In combination with a tractor, a draw bar having a rearwardly extending crank part, means for detachably connecting the bight of said crank part with the center of the tractor with the end portions of the bar extending forwardly of the tractor and to opposite sides thereof, implement beams having eyes at their front ends receiving said end portions, upright members having eyes at their lower ends receiving said end portions, a pair of levers at the rear of the tractor, links connecting the same with the upper ends of the upright members, a hook connected with end portion of the draw bar, a spring having one end connected with the hook and the other to a link, yieldable means for connecting the beams to the upright members whereby the beams will be swung upwardly when the upright members are swung forwardly and the beams will be lowered when the upright members are moved rearwardly, the yielding means also tending to apply pressure to the beams, a draw bar at the rear of the tractor, an implement beam connected therewith, an upright member, means for yieldably connecting the same with the last-mentioned beam, said upright member being supported on the last-mentioned draw bar and means for connecting the levers to said upright member.

3. In combination with a tractor, a member connected to the front end thereof and extending forwardly, clamping means at the front end of said member, a draw bar held by said clamping means, implement beams having their forward ends pivoted to the end portions of said bar, upright members having their lower ends pivoted to said end portions of the bar, means for yieldingly connecting the beams to said upright members, a pair of levers supported at the rear of the tractor, links connecting said levers with the upright members, brace bars having their forward ends connected with the end portions of the bar, and means for detachably connecting the rear ends of said brace bars to rear portions of the tractor.

4. In combination with a tractor, forwardly extending members connected with the front end thereof and having clamps connected with their front ends, a draw bar having a centrally arranged crank portion, the bight of which is held by said clamps, implement beams having their forward ends pivoted to the end portions of the bar, uprights having their lower ends pivoted to the end portions of the bar, yieldable means for connecting the uprights to the beams, a pair of levers supported from the rear part of the tractor, links connecting said levers with the upright members, and spring means tending to hold the upright members in forward position.

5. In combination with a tractor, a draw bar connected with the front end thereof, implement beams pivoted to the end portions of said bar, a pair of levers supported at the rear part of the tractor, means for raising and lowering the beams by said levers, a rear draw bar at the rear of the tractor, an implement beam having its forward end pivotally connected with the rear draw bar, an upright member having its lower end pivoted to the rear draw bar, means for yieldably connecting said upright member to the rear beam, a cross bar having its central portion pivoted to the upper end of the last-mentioned upright, and links connecting the ends of the cross member with the levers.

HUGO ALBERT KOLTERMAN.